Figure 1:
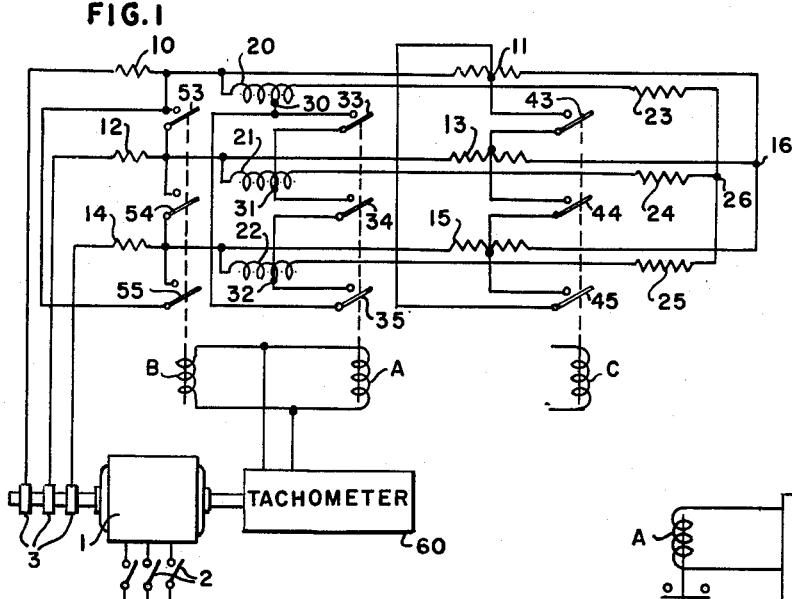

April 13, 1965  C. W. CHAPMAN  3,178,626
STARTING CIRCUIT FOR WOUND ROTOR MOTORS
Filed Dec. 27, 1960

Charles William Chapman
INVENTOR.

BY Merton D. Mone

ATTORNEY

United States Patent Office 3,178,626
Patented Apr. 13, 1965

3,178,626
STARTING CIRCUIT FOR WOUND ROTOR
MOTORS
Charles W. Chapman, Schenectady, N.Y., assignor to
General Electric Company, a corporation of New York
Filed Dec. 27, 1960, Ser. No. 78,707
9 Claims. (Cl. 318—240)

My invention relates to starting means for wound rotor induction motors and to means for effecting certain improvements in the starting speed torque characteristics thereof.

An object of my invention is to provide a secondary starting circuit for such motors capable of maintaining starting torque substantially constant until normal running speed is substantially reached and with a minimum of switching operations.

In starting motors which drive loads of the character of belt conveyors, for example, a problem arises of keeping the starting torque within a desired range. The lower limit of this range may be, for example, ninety percent of the rated torque of the motor, or other value sufficient to assure satisfactory and reliable starting and acceleration of the conveyor under load. An upper limit of the range may be a value sufficiently low that it does not cause excessive stress in the belt of the conveyor, its stretching, or rupture. This value may be one hundred and twenty-five percent of the rated torque of the motor.

An object of my invention is to maintain the torque produced by the motor substantially at a constant value within this range, without objectionable abrupt variations therein, and with a minimum number of switching contacts.

Another object of my invention is to effect such starting, utilizing reactors in the secondary circuit of the motor of a simple iron or air core type having a single tap and utilizing a single switching operation in connection with each reactor.

In accord with my invention, common load resistances are utilized in the secondary polyphase circuit, which may comprise a Y connection of resistors to a neutral point. At a suitable point on these resistances, which may be intermediate thereof, or the motor terminal, one terminal of a reactor is connected, the other terminal being connected through an additional resistance to a neutral point, which, in some cases, may be the neutral point mentioned above; or, in other cases, a neutral point isolated therefrom; thereby forming a branch secondary circuit.

These reactors may be simple iron core reactors and each is provided with a single intermediate tap.

In the starting operation, as the torque reduces during acceleration of the motor to a predetermined value within the above-mentioned range these taps may be short circuited together, whereupon each reactor acts as a transformer, one part of the reactor winding serving as a primary, these primaries being connected in a Y connection, and in shunt with that part of the first-mentioned load resistance between the reactor and the first-mentioned neutral point. This primary induces voltage into the remaining part of the reactor winding, which acts as a secondary, supplying current to the resistance in series with it and producing dissipation therein.

This shorting of the taps together causes an increase of torque with further increase of speed. By appropriate choice of the position of the tap and value of series resistance this increase of torque may be made to occur at an unobjectionably rapid rate to a maximum well within the desired range and then to fall off at a rate that becomes rapid in the range of speed approximately the normal running speed. When this rapid reduction in torque begins the secondary circuit may be shorted out altogether, or, if desired, shorted through desired resistance, thereby again increasing torque to a value within the desired range. Thereafter the speed increases to normal running speed with rapidly and desirably reducing torque.

In this way the speed of the motor may be made to increase substantially linearly with time from the time of initial energization of the motor until it attains normal running speed, without excessive torque at any point and with only two switching operations.

If desired, in some operations, the shorting together of the reactor taps may be preceded by shorting out part of the load resistance nearest the neutral thereby to produce high initial starting torque at low speeds. This, however, is in the nature of emergency operation and may in most cases be omitted.

Figure 4:
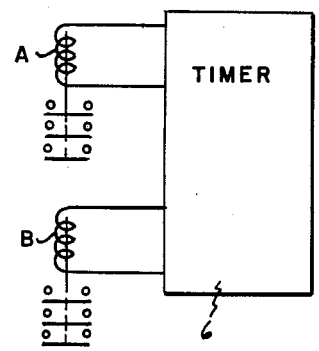
Figure 2:
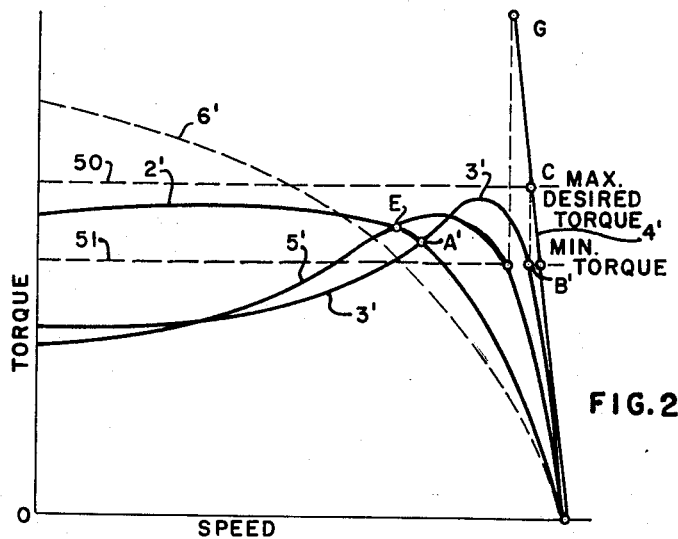
Figure 3:
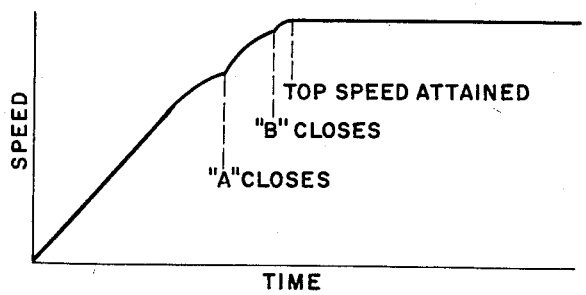

The novel features which I believe to be characteristic of my invention are set forth with particularly in the appended claims. My invention, itself, however, both as to its organization and method of operation, together with further objectives and advantages thereof, may best be understood by reference to the following description, taken in connection with the accompanying drawing in which FIG. 1 represents an embodiment of my invention, FIG. 2 and FIG. 3 represent certain characteristics of its operation, and FIG. 4 represents a modification.

Referring to the drawing, I have illustrated in FIG. 1 thereof an induction motor 1 which may be energized from a suitable power source to which it may be connected by a three phase switch 2.

This motor 1 may be assumed to have the usual polyphase wound rotor and slip rings 3 for connection of the rotor winding to a secondary starting circuit.

This secondary starting circuit may comprise one or more resistors in each phase; for example, resistors 10 and 11 in one phase, resistors 12 and 13 in a second phase, and resistors 14 and 15 in a third phase, these various phases being connected in a conventional Y connection to a neutral point 16.

In accord with my invention, a simple iron or air core reactor, shown at 20, 21 and 22 in the drawing is provided, one in each phase, the reactor in each phase having one terminal connected at a point between the resistors in the respective phase and a second point connected through a corresponding resistor 23, 24 or 25, to a neutral point 26.

These neutral points 16 and 26 may be permanently short circuited together but they are shown isolated because some advantage results from isolation of them, this advantage residing in reduced current in certain of the switching contacts.

Each reactor and its associated resistor may be referred to hereafter as a branch circuit to each phase. Each reactor is provided with a tap, such as the tap 30 on reactor 20, the tap 31 on reactor 21, and the tap 32 on reactor 22, together with switching means 33, 34, and 35 whereby these taps may be short circuited together. When so short circuited each reactor operates as a transformer, the portion at the left of the tap serving as the primary, these primaries being connected in a Y connection. The portion at the right of the tap serves as a secondary producing dissipation of energy in the resistances 23, 24 and 25.

The switches 33, 34 and 35 are shown mechanically connected together, for actuation, preferably by means of an actuating coil A, although, of course, they may be operated manually, as desired.

To the left of reactors 20, 21 and 22 is shown a second group of switches 53, 54 and 55 which operate to short circuit all of that portion of the secondary circuit to the right of these switches. They are shown as mechanically connected together for a simultaneous operation as by a coil B.

Switches 35 and 55 may be omitted since the desired short circuiting is effected by the other switches, the determining factor being the current carrying capacity of the switches.

The switches controlled by coil A are closed after switch 2 is closed and at a time in the speed torque characteristic when the torque begins to drop. At a still later time when the torque again reduces the switches controlled by coil B are closed.

A further group of switches 43, 44 and 45 is shown connected to short circuit an intermediate point on resistors 11, 13 and 15. These switches are not normally provided but may be used in emergency situations where excessive torque is required in the early part of the starting operation.

FIG. 2 illustrates certain speed torque characteristics of the equipment illustrated in FIG. 1, speed being plotted as abscissa and torque being plotted as ordinates. The horizontal line 50 may be taken to represent maximum desired torque, that is torque in excess of which would subject a conveyor belt; for example, to excessive stresses, stretching, or possible rupture. It may be assumed to be 125% of the rated torque of the motor.

Horizontal line 51 may represent a value of torque usually less than rated value but sufficient to produce satisfactory and reliable operation of the load after acceleration of the load, and may be taken to be 90% of rated torque.

Curve 2′ may be taken to represent the speed torque characteristic of the motor when all of the switches are open. It will be seen that after closing switch 2 the motor starts and accelerates to a relatively high speed but that the torque gradually falls off in the higher range until a point A′ is reached at which time switches 33, 34 and 35 may be closed as by energization of winding A. The torque characteristic now becomes as represented by the curve 3′. It will be seen that with further increase in speed the torque increases rather rapidly, but not excessively so, to a maximum and finally falls off to a point B′. At this point switches 53, 54 and 55 may be closed whereupon the speed torque characteristic becomes as indicated by the curve 4′. Here the torque of the motor increases to a point C on curve 4′ which is within the range defined by lines 50 and 51. This increase is torque occurs at the same speed which is within a few percent, for example 10 percent, of the normal operating speed of the motor. This percentage will vary somewhat dependent upon value of torque represented by line 51 in a particular installation.

It is important that the right-hand portion of curve 3′ closely adjacent the higher torque curve 4′ so that the closing of switches 53, 54 and 55 may be effected to shift the operation of the motor to the higher torque characteristic without substantial change in speed, or excessive change in torque.

Curve 5′ is not characteristic of the present invention. It is illustrated to represent one type of characteristic which the present invention avoids. This curve may occur from switching values of resistance alone. It may be taken to represent the operation that would occur were connections 30, 31 and 32 made to the right-hand terminal of the respective reactors, as shown on the drawing, rather than to taps thereon, so that the resistances 23, 24 and 25 are shorted out by the switches and the reactors are left in circuit in their entirety. This characteristic, curve 5′, is objectionable in that reduction of torque occurs at a speed so low that closing of switches 53, 54 and 55, even at the lower limit 51 of the range, produces an abrupt rise in torque to a value greatly exceeding the upper predetermined limit 50 of the range as represented by the point G on curve 4′. This can be avoided by additional switching. In accord with the present invention, however, this avoidance is effected without additional switching by use of the tap connection to the reactors, thereby changing the characteristic to that represented by the curve 3′. This reduces the change in torque effected by the last switching operation to that represented by the vertical line B′C where the value C does not exceed the predetermined limit of the range represented by the horizontal line 50.

In FIG. 1 are also shown switches 43, 44 and 45 which may be utilized in emergency situations where excessively high torque is desired in the initial part of the starting operation. These switches may be operated by hand or by a winding C which may be energized in any desired way. With these switches closed the speed torque characteristic is as shown by the dotted line curve 6′ of FIG. 2.

In FIG. 1 the groups of switches 33, 34 and 35 and 53, 54 and 55 are illustrated as operated by windings A and B, respectively, these windings being connected in parallel to the output of tachometer 60 on the shaft of the motor. This tachometer may produce increasing current in this output with increasing speed. The values of current required for operation of the switches by windings A and B, respectively, may be so chosen that the winding A operates its switches when a speed is reached corresponding to the point A′ in FIG. 2. Similarly, the winding B may be energized to operate its switches when the speed attains a value corresponding to the point B′ of FIG. 2.

If desired, the tachometer may be replaced by an alternating current generator producing a voltage having a frequency varying with the speed of the motor. In this case the windings A and B may be made frequency responsive to operate at the times represented by the points A′ and B′.

FIG. 3 represents the increase of speed of the motor with time, time being plotted as abscissa and speed as ordinates. This curve also shows the points in this curve at which the windings A and B close the respective switches. It will be noticed that the motor speed increases practically linearly to its normal top operating speed without substantial variation from the linear relationship. This curve represents very satisfactory performance which is effected by only two switching steps and which results from the use of reactors as illustrated and described.

FIG. 4 represents a modification of the invention in which rectangle 6 represents a simple timer for energizing the windings A and B to operate their respective switches at times corresponding to points A′ and B′ in FIG. 2.

While I have shown a particular embodiment of my invention, it will, of course, be understood that modifications may be made therein, both in the circuit arrangement and instrumentalities employed and that I contemplate by the appended claims to cover any such modifications as fall within the true spirit and scope of my invention.

What I claim as new and desire to secure by Letters Patent of the United States is:

1. The combination, in a starting circuit for a wound rotor polyphase induction motor, of a secondary polyphase circuit connected to the rotor winding of said motor, and comprising resistance means in each phase between said winding and a common neutral, and a branch circuit for each phase comprising a reactor and resistance means in series therewith connected between a point intermediate the ends of said first mentioned resistance means and a common neutral, and means to maintain the torque produced by said motor during the starting operation within a desired range, said means comprising means to short circuit together a desired intermediate point on each of said reactors at a time in the starting operation when the torque drops toward the lower limit of said range, said intermediate points being so chosen on said reactors that after establishment of said short circuit the torque rises with increased speed to a desired value within said range.

2. The combination, in a starting circuit for a wound rotor polyphase induction motor, of a secondary polyphase circuit connected to the rotor winding of said motor, and comprising resistance means in each phase between said winding and a common neutral, and a branch circuit for each phase comprising a reactor and a resistance means in series therewith connected between a point intermediate the ends of said first mentioned resistance means and a common neutral, means to maintain the torque produced by said motor during the starting operation within a desired range, said means comprising means to short circuit together a desired intermediate point on each of said reactors at a time in the starting operation when the torque drops toward the lower limit of said range, said intermediate points being so chosen on said reactors that after establishment of said short circuit the torque rises with increased speed to a desired value within said range, and means thereafter in response to the increase of speed of said motor to short circuit together said first-mentioned points.

3. The combination, in a starting circuit for a wound rotor polyphase induction motor, of a polyphase circuit connected to the rotor winding of said motor comprising first and second resistances in each phase in that order between said winding and a common neutral, a branch circuit for each phase comprising a reactor and a resistor in that order between a point between said first and second resistances and a common neutral, and means in the starting operation to short circuit at successively higher speeds of the motor, first, corresponding intermediate points on said reactors, and second, said second resistors.

4. The combination, in a starting circuit for a wound rotor polyphase induction motor, of a polyphase circuit connected to the rotor winding of said motor comprising first and second resistances in each phase in that order between said winding and a common neutral, a branch circuit for each phase comprising a reactor and a resistor in that order between a point between said first and second resistances and a common neutral, and means in the starting operation to short circuit at successively higher speeds of the motor, first, corresponding intermediate points on said second resistances, second, corresponding intermediate points on said reactors, and third, corresponding points between said first and second resistances all of said points being so chosen that as the speed increases after establishing any of said short circuits the motor torque gradually rises to a desired common value within a desired range of starting torques.

5. The combination, in a starting circuit for a wound rotor polyphase induction motor, of a secondary starting circuit for the motor comprising a polyphase circuit having resistance means in each phase connected to a common neutral and a reactor and resistor in a branch circuit connected to a point intermediate the ends of said resistance means in each phase and to a common neutral, and means to short circuit together an intermediate point on each reactor whereby each reactor acts as a transformer, having primaries in Y connection across said phases and a secondary producing dissipation in said resistors.

6. The combination, in a starting circuit for a wound rotor induction motor, of a secondary polyphase circuit comprising resistance means in each phase connected to a neutral, and a branch circuit connected to a point intermediate the ends of said resistance means in each phase and to a neutral, each branch circuit comprising a reactor and a resistor in series, the values of said resistors in said branch circuits being such that upon energization of said motor said motor produces substantially uniform torque until high speed is reached, means to short circuit together an intermediate point on each said reactor thereby to cause said torque to increase with increase in motor speed to a maximum and thereafter to reduce with increase in motor speed, and means to short circuit an intermediate point on each of said resistance means before said torque reduces below a desired predetermined value and at a motor speed at which increase in torque produced by said last short circuiting means does not exceed a desired predetermined value.

7. The combination, in a starting circuit for a wound rotor induction motor, of a secondary polyphase circuit comprising resistance means in each phase connected to a neutral, and a branch circuit connected to a point intermediate the ends of said resistance means in each phase and to a neutral, each branch circuit comprising a reactor and a resistor in series, the values of said resistors in said branch circuits being such that upon energization of said motor said motor produces substantially uniform torque until high speed is reached, means to short circuit together an intermediate point on each said reactor thereby to cause said torque to increase with increase in motor speed to a maximum and thereafter to reduce with increase in motor speed, and means to short circuit an intermediate point on each of said resistance means before said torque reduces below a desired predetermined value and at a motor speed at which increase in torque produced by said last short circuiting means does not exceed a desired predetermined value, said torque values being separated by not more than 35 percent of the rated torque of the motor.

8. The combination, in a starting circuit for a wound rotor induction motor, of a secondary polyphase circuit comprising resistance means in each phase connected to a neutral, and a branch circuit connected to a point intermediate the ends of said resistance means in each phase and to a neutral, each branch circuit comprising a reactor and a resistor in series, the values of said resistors in said branch circuits being such that upon energization of said motor said motor produces substantially uniform torque until high speed is reached, means to short circuit together an intermediate point on each said reactor thereby to cause said torque to increase with increase in motor speed to a maximum and thereafter to reduce with increase in motor speed, and means to short circuit an intermediate point on each of said resistance means before said torque reduces below a desired predetermined value and at a motor speed at which increase in torque produced by said last short circuiting means does not exceed a desired predetermined value, said last speed being within ten percent of normal running speed of said motor.

9. A secondary starting circuit for a wound rotor induction motor adapted to impart to the motor three different speed torque characteristics in succession, the first characteristic having rapidly reducing torque at high speeds, the second having a maximum torque in the range where the first characteristic has rapidly reducing torque and having rapidly reducing torque at speeds above said maximum, and the third having rapidly reducing torque having values equal to those of the second characteristic at slightly higher speeds, said circuit comprising resistance means in each phase of said secondary circuit connected to a common neutral and a branch path comprising a reactor and a resistor connected to a point intermediate the ends of each resistance means and to a common neutral, to produce said first characteristic, means to short circuit together corresponding intermediate points on said reactors to produce said second characteristic, and means to short circuit said resistance means to produce the third characteristic.

References Cited by the Examiner
UNITED STATES PATENTS

| | | | |
|---|---|---|---|
| 731,887 | 6/03 | Girault | 318—238 |
| 735,190 | 8/03 | Zani | 318—238 |

JOHN F. COUCH, *Primary Examiner.*

MILTON O. HIRSHFIELD, ORIS L. RADER,
*Examiners.*